(12) United States Patent
Shin et al.

(10) Patent No.: US 12,026,313 B1
(45) Date of Patent: Jul. 2, 2024

(54) HAPTIC DEVICE WITH COUPLED RESONANCE AT TUNABLE FREQUENCIES

(71) Applicant: Meta Platforms Technologies, LLC, Menlo Park, CA (US)

(72) Inventors: Dongsuk Shin, Seattle, WA (US); Sai Sharan Injeti, Pasadena, CA (US)

(73) Assignee: META PLATFORMS TECHNOLOGIES, LLC, Menlo Park, CA (US)

( * ) Notice: Subject to any disclaimer, the term of this patent is extended or adjusted under 35 U.S.C. 154(b) by 471 days.

(21) Appl. No.: 17/332,787

(22) Filed: May 27, 2021

Related U.S. Application Data

(60) Provisional application No. 63/199,541, filed on Jan. 7, 2021.

(51) Int. Cl.
| | |
|---|---|
| *G06F 3/01* | (2006.01) |
| *H02K 33/04* | (2006.01) |
| *H02K 33/18* | (2006.01) |

(52) U.S. Cl.
CPC .............. *G06F 3/016* (2013.01); *H02K 33/04* (2013.01); *H02K 33/18* (2013.01)

(58) Field of Classification Search
CPC ........ G06F 3/016; H02K 33/00; H02K 33/04; H02K 33/18
USPC .......................................... 310/12.25, 24, 25
See application file for complete search history.

(56) References Cited

U.S. PATENT DOCUMENTS

| | | | | |
|---|---|---|---|---|
| 8,443,665 | B2* | 5/2013 | Hsu ..................... | G01C 19/5719 73/504.12 |
| 10,782,130 | B2* | 9/2020 | Kuisma .............. | G01C 19/5769 |
| 2008/0024038 | A1* | 1/2008 | Chen ...................... | H02N 10/00 310/317 |
| 2010/0064395 | A1* | 3/2010 | Clark ..................... | G01Q 40/00 850/26 |
| 2012/0206248 | A1* | 8/2012 | Biggs .................. | H10N 30/063 156/70 |
| 2012/0323522 | A1* | 12/2012 | Turunen .............. | H04M 19/047 702/141 |
| 2019/0318590 | A1* | 10/2019 | Bilal ........................ | G08B 6/00 |
| 2023/0212002 | A1* | 7/2023 | Melnikov .............. | H04R 17/00 257/415 |

* cited by examiner

*Primary Examiner* — Rashad H Johnson
(74) *Attorney, Agent, or Firm* — Morgan, Lewis & Bockius LLP

(57) ABSTRACT

A haptic device with coupled resonance at tunable frequencies includes an actuator, a first structure coupled to the actuator, a second structure coupled to the first structure and separate from the actuator, and at least one local mass coupled to the first or second structure; the first and second structure having resonance such that application by the actuator of a resonance frequency to the first structure causes the first and second structures to resonate in phase and displace the local mass. A method of forming a haptic device includes coupling an actuator to a first structure, coupling the first structure to a second structure, locating a mass on at least one of the first or second structures, and configuring the actuator to, upon activation, excite the first structure at a resonance frequency of the haptic device such that the first and second structures resonate in phase and displace the mass.

20 Claims, 7 Drawing Sheets

HAPTIC DEVICE WITH COUPLED RESONANCE AT TUNABLE FREQUENCIES

CROSS-REFERENCE TO RELATED APPLICATION

This application claims the benefit of priority to U.S. Provisional Application No. 63/199,541, filed Jan. 7, 2021, which is incorporated by reference herein in its entirety.

BACKGROUND

Haptic technology typically provides a tactile response such as vibration or shaking as physical feedback via a surface, like a touchscreen or housing, which is stiff or non-responsive, to simulate the feeling of touch for a receiver of the haptic feedback. Conventional haptic technology involves actuators, motors or ultrasound beams, to generate localized vibrations. How effective haptic feedback is to the receiver of the haptic feedback is based on the forces felt on the touchscreen, which is dependent on both frequency and magnitude of vibration. Enhancing vibration from the actuators can be hard to control because typically stiffness of the surface material, displacement of the touch area, and frequency of resonance of the vibrations are all interdependent.

One conventional approach to amplify displacement of the touch area is to reduce a stiffness of the touch area. However, reducing the stiffness of the touch area too much can introduce ambiguity of haptic feedback (e.g., the vibration may be less uniform and/or more difficult for the user to perceive).

Another conventional way to amplify forces in haptics is by using several actuators; however, this adds additional expense and may make the overall device unacceptably bulky.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items.

DETAILED DESCRIPTION

Overview

Figure 1A:
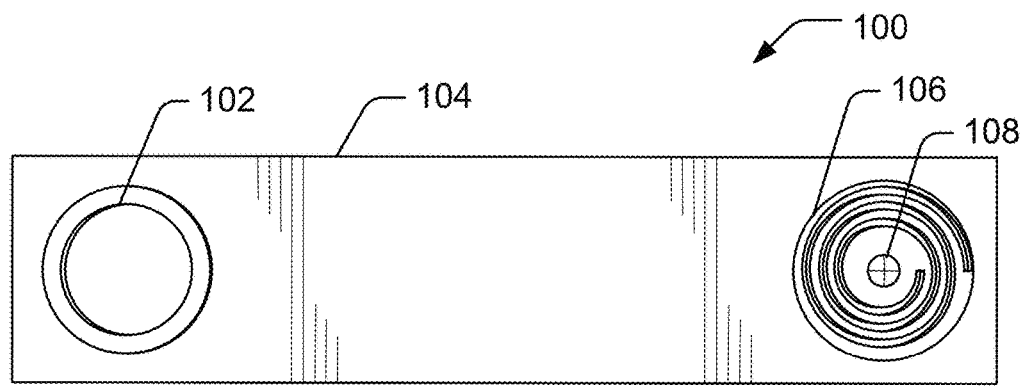
FIG. 1A illustrates a top-down view of an example haptic device as described herein.

As noted above, typically haptic technology provides a tactile response such as vibration as physical feedback via a surface, like a touchscreen or housing, which is stiff or non-responsive, to simulate the feeling of touch for a receiver of the haptic feedback. To be effective, the vibrations imparted by the haptic device need to be of sufficient force and of low enough frequencies to be perceived by a user's skin. The force imparted by the by the haptic device is dependent on a magnitude of local displacement of the touch surface and a local stiffness of the haptic device. Moreover, local stiffness, local displacement, and frequency of resonance of the vibrations are all interrelated. For example, increasing local stiffness of a structure typically leads to local displacement dropping and the frequency of resonance rising. Conventional haptic devices have been incapable of providing vibrations of adequate force and at low enough frequencies, without sacrificing local stiffness of the device and/or using multiple actuators to drive the vibration thereby requiring a larger form factor. Thus, there is a need to decouple displacement, stiffness, and frequency of resonance and to use a single actuator to reduce overall device size.

This application describes haptic devices that can amplify local displacement without compromising local stiffness while maintaining low frequency of resonance (e.g., about 100 Hz or below) and a small form factor (e.g., with length (in millimeters (mm)) of a haptic device between at least about 5 mm to at most about 150 mm). For example, a haptic device as described herein can include a relatively stiff base structure (having a first rigidity) coupled to a relatively more compliant secondary region (having a second rigidity which is lower than the first rigidity), and a relatively heavy mass coupled to the secondary region. The base structure can represent a lever, a plate, a cantilever, a rod, or other relatively rigid structure. By way of example and not limitation, the base structure can have a flexural rigidity (in Newton-meters (N/m)) of at least about 50 N/m, and in some examples the rigidity can be at least about 0.1 N/m and at most about 2 GN/m. The base structure can be made from one or more materials including, but not limited to Polybutylene Terephthalate (PBT) and/or Polyethylene Terephthalate (PET), etc., and/or metals/alloys such as Steel, Aluminum, Copper, Tungsten, etc. The secondary region can be designed so that the base structure resonates in phase with the secondary region, producing enhanced local displacement near the tip the secondary region farthest from the actuator at low frequencies. In some examples, the secondary region can comprise an Archimedean spiral cut pattern, a zigzag cut pattern, a spring (e.g., a coil spring, a leaf spring, a coaxial spring, etc.), a membrane, an elastomeric patch, a web of elastomeric fibers, or any other relatively compliant structure. By way of example and not limitation, the secondary structure can have a flexural rigidity of at most about 5 N/m, and in some examples the rigidity of the secondary structure can be between about 0.01 N/m and about 1 MN/m. The secondary structure can be made from one or more materials including, but not limited to Polybutylene Terephthalate (PBT) and/or Polyethylene Terephthalate (PET) etc., and/or metals/alloys such as Steel, Aluminum, Copper, and Tungsten, etc. In various examples, the relatively heavy mass coupled to the secondary region can include a circle or ball-shaped mass, a triangular-shaped mass, a square-shaped mass, a rectangular-shaped mass, or an irregularly shaped mass, etc. By way of example and not limitation, the mass coupled to the secondary structure can have a density (in grams per cubic centimeter (g/cc)) of at most about 16 g/cc, and in some examples the density of the mass can be between about 1 g/cc and about 20 g/cc. The mass can be made from one or more materials including, but not limited to Polybutylene Terephthalate (PBT) and/or Polyethylene Terephthalate (PET) etc., and/or metals/alloys such as Steel, Tungsten Carbide, Lead, Aluminum, Copper, and/or Chromium. One example of a mass includes a 1.25 mm radius tungsten carbide ball (Young's modulus=610 GPa, density=16,000 kg/m$^3$).

By using the relatively heavy point mass and vibrating the haptic device in resonance, the haptic device can achieve significant magnitude of displacement at low frequencies while maintaining a high stiffness, hence amplifying the vibro-tactile haptic force feedback. A haptic device as described herein can create such low frequency vibrations that generate enough force while keeping a low or small form factor.

This disclosure describes a haptic device with coupled resonance at tunable frequencies and methods for making and using a haptic device with coupled resonance at tunable frequencies. Resonance represents the phenomenon of increased amplitude that occurs when the frequency of a periodically applied force is equal to, or close to, a natural frequency of the system upon which the force acts.

The disclosure is described with reference to apparatuses, block diagrams, and flow diagrams of systems, methods, and/or computer program products according to various examples. It will be understood that one or more blocks of the block diagrams and flow diagrams, and combinations of blocks in the block diagrams and flow diagrams, respectively, can be implemented by computer-executable program instructions. Likewise, some blocks of the block diagrams and flow diagrams need not necessarily be performed in the order presented or need not necessarily be performed at all, according to some examples of the disclosure.

In examples, the application describes a device that includes an actuator, a first structure coupled to the actuator, a second structure coupled to the first structure and separate from the actuator, and a local mass coupled to the second structure, wherein the first structure and the second structure have resonance, such that application by the actuator of a resonance frequency to the first structure can cause the first structure and the second structure to resonate in phase and displace the local mass.

In examples, the application describes such a device in which the first structure comprises a cantilever between the actuator and the second structure.

In examples, the application describes such a device in which the second structure comprises one or more of: a spiral structure, an elastomer patch, or a web of fibers.

In examples, the application describes such a device in which the first structure includes a first spring, and the second structure includes a second spring coupled in series with the first spring.

In examples, the application describes such a device in which the local mass is a first local mass, and the device further comprises: a third structure coupled to the first structure and separate from the actuator, and a second local mass coupled to the third structure.

In examples, the application describes such a device in which the resonance frequency is a first resonance frequency, and the application by the actuator of a second resonance frequency to the first structure can cause the first structure and the third structure to resonate in phase and displace the second local mass, and the first structure and the second structure to resonate out of phase.

In examples, the application describes such a device in which the first structure can have a first density, and the second structure has a second density that is less than the first density. In examples, the application describes such a device in which the local mass can have a third density that is greater than the first density.

In examples, the application describes such a device in which the local mass is a first local mass, and the device further comprises: a third structure coupled to the first structure and separate from the actuator, the third structure having a fourth density that is less than the first density; and a second local mass coupled to the third structure, the second local mass having a fifth density that is greater than the first density.

In examples, the application describes such a device in which the resonance frequency is a first resonance frequency, the second structure has a second density that is less than the first density, and the fourth density is different than the second density, the fifth density is different than the third density, and the application by the actuator of a second resonance frequency to the first structure can cause: the first structure and the third structure to resonate in phase and displace the second local mass, and the first structure and the second structure to resonate out of phase.

In examples, the application describes such a device in which the device is a wearable device, and the actuator is located remote from the second structure.

In examples, the application describes such a device in which the wearable device is a glove, the second structure and the local mass are located at a fingertip of the glove, and the actuator is located at a wrist or a back of the glove.

In examples, the application describes such a device in which the local mass is comprised of tungsten carbide.

In examples, the application describes a method of forming a haptic device that can include coupling an actuator to a first structure, coupling the first structure to a second structure, locating a mass on at least one of the first structure or the second structure, and configuring the actuator to, upon activation, excite the first structure at a resonance frequency of the haptic device such that the first structure and second structure resonate in phase and displace the mass.

In examples, the application describes such a method of forming the haptic device including forming the second structure as at least one of: a spiral structure, a patch, or a web.

In examples, the application describes such a method of forming the haptic device in which at least one of: the spiral structure is formed by a process including: injection molding, three-dimensional printing, or cutting, the patch includes an elastomer patch, or the web is comprised of fibers.

In examples, the application describes such a method of forming the haptic device including affixing the mass to the second structure.

In examples, the application describes such a method of forming the haptic device in which the first structure includes a first spring, the second structure includes a second spring, and the method further comprises coupling the first spring and the second spring in series.

In examples, the application describes such a method of forming the haptic device in which the resonance frequency is a first resonance frequency, and the mass is a first mass, and the method includes: coupling a third structure to the first structure in a location separate from the actuator, coupling a second mass to the third structure, and configuring the haptic device such that application by the actuator of a second resonance frequency to the first structure can cause: the first structure and the third structure to resonate in phase and displace the second mass, and the first structure and the second structure to resonate out of phase.

In examples, the application describes a method of using a device including: receiving a touch input at an input location of the device having an associated haptic device, causing, based on receiving the touch input, an actuator associated with the haptic device to apply a resonance frequency to a first structure of the device that is coupled to the actuator and has an associated second structure that is separate from the actuator, the second structure coupled to a local mass, in which the resonance frequency causes the first structure and the second structure to resonate.

In examples, the application describes such a method of using the device in which application by the actuator of the resonance frequency to the first structure causes the first structure and the second structure to resonate in phase and displace the local mass.

In examples, the application describes such a method of using the device in which application by the actuator of a frequency other than the resonance frequency to the first structure causes the first structure and the second structure to resonate out of phase and dampen displacement of the local mass.

FIG. 1A illustrates a top-down view of an example haptic device 100. The haptic device 100 includes an actuator 102, which in various examples can represent a vibration source. By way of example and not limitation, the actuator can comprise an eccentric rotating mass vibration motor (ERM), a linear resonant actuator (LRA), a moving coil or voice coil actuator, a piezo actuators, or any other actuator capable of imparting a vibration to a base structure.

The actuator 102 can be coupled to a first structure, which is illustrated as a cantilever first structure 104. The first structure 104 can be in the form of a substantially planar sheet, a curved cantilever and/or a plate. The size, shape, and material of the first structure 104 can depend on a variety of design considerations such as, for example, an available space for the haptic device, a desired output force, a desired range vibration frequency, a rigidity of a contact surface to which the vibration is to be imparted, and the like. By way of example and not limitation, the first structure 104 can have a length (in millimeters (mm)) of between about 5 mm and about 150 mm, a width (in millimeters (mm)) of between about 2 mm and about 50 mm, and height or thickness (in millimeters (mm)) of between about 0.2 mm and about 6 mm. In one specific example, as the first structure 104 comprises a substantially planar cantilevered beam having a length of about 65 mm, a width of about 15 mm, and a height of about 1.5 mm. In one particular example, the first structure 104 can be made from a polymer (e.g., Nylon 12 having a Young's modulus=1.2 GPa and a density=983 kg/m$^3$). However, as discussed above, in other examples the first structure 104 can have other shapes, dimensions, and/or materials, depending on the desired performance and design considerations.

The first structure 104 can be coupled to a second structure 106.

In the example illustrated in FIG. 1A the second structure 106 is shown as a spiral structure, though other configurations are possible. For example, in addition to or instead of the illustrated spiral structure, the second structure 106 can include any of the other structures described for the secondary structure throughout the application. In at least one example, the second structure 106 can be formed integrally with the first structure 104 and/or of a same piece of material as the first structure 104. For example, the second structure 106 can be formed from a thicker part of the first structure 104 into which a spiral shape has been formed, e.g., by carving, punching, laser cutting, etc. Depth and thickness of grooves, cuts, and/or the material of the second structure 106 can change displacement amplitude in response to the same resonance frequency from the actuator 102 such that a second structure 106 that is more compliant (e.g., less rigid) and/or with deeper or wider grooves or cuts can allow for more dampening from touch and less displacement from application of a resonance frequency by the actuator 102 to the first structure 104. By way of example and not limitation, the second structure 106 can comprise a coil having between about 2 and about 6 coils, each coil having a thickness of between about 1 mm and about 1.5 mm, and a cut or space formed between adjacent coils of between about 0.2 mm and about 0.5 mm. Additionally, a thickness of the second structure 106 can be substantially the same as or different than a thickness of the first structure 104. In some examples, the second structure 102 can be thinner than the first structure 104.

A local mass 108 can be embedded, adhered, bonded, welded, or otherwise coupled to the second structure 106. The local mass 108 can be formed from the same material as the second structure and/or a different material. When the local mass 108 is formed from the same material, a greater volume of material can be used to form the local mass 108. When the local mass 108 is formed from a different material, a lesser volume of a material having greater density than that of the first structure 104 and/or second structure 106 can be used to form the local mass 108. Application by the actuator 102 of a resonance frequency to the first structure 104 can cause the first structure 104 and the second structure 106 to resonate in phase and displace the local mass 108.

Stiffness of regions of a haptic device can be influenced by the first structure and second structure, and can be engineered to a precise value. A local mass can be engineered to tune the frequency of resonance to low values, which can be suitable for haptics without altering the local stiffness or displacements in the overall structure. Dimensions of the haptic surface indicated in this disclosure are merely examples; the structure can be scaled up or down (by at least an order of magnitude) and the resulting frequencies can be tuned by altering the mass. Materials that make up the structures and mass can be altered to obtain desired values of stiffness, displacements, and frequencies in various examples.

Figure 1B:
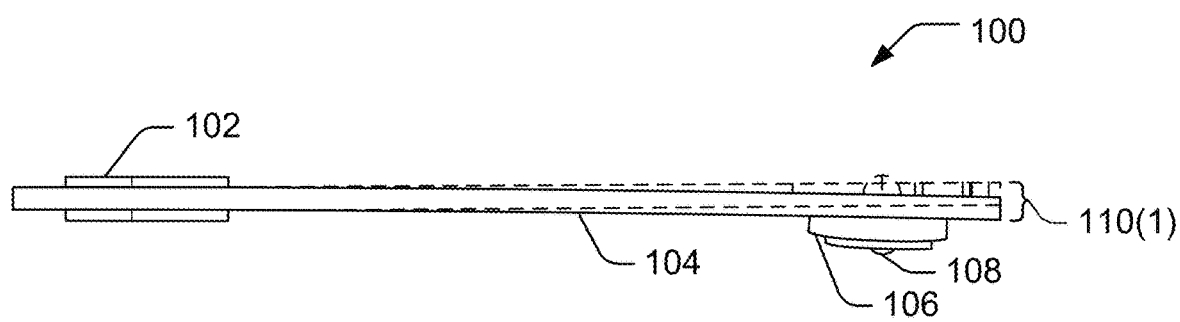
FIG. 1B illustrates a right-side perspective of the example haptic device of FIG. 1A in a first position.

FIG. 1B illustrates a right-side perspective of the example haptic device 100 with actuator 102, first structure 104, second structure 106, and local mass 108 at a first example state of motion with the second structure 106 and local mass 108 extending further down than the first structure 104. FIG. 1B shows the mode shape of the haptic device 100 at an example resonance frequency (e.g., ~65 Hz), with harmonic excitation at the actuator 102.

The example shows displacement 110(1) and stiffness amplification at the example resonance frequency due to mode coupling, which is a greater displacement 110(1) than if there had been fewer grooves or cuts in the same patch area (second structure 106) and/or no local mass 108, thereby failing to achieve mode coupling. More or thicker grooves or cuts and no local mass would have resulted in a soft patch (second structure 106), which would not affect mode coupling and would have less displacement amplification 110(1), e.g., about 10× less. An example having a reduced cut thickness allows for mode coupling between the second structure 106 and first structure 104 at resonance, which enables an increased displacement amplitude together with increased stiffness. In examples described herein, adding a local mass 108 allows the resonance frequency to remain low enough for human sensing. In at least one example, the first structure can be made of Nylon 12 and the local mass 108 can be made of tungsten carbide, which is 16 times as dense as Nylon 12. In some examples, local mass 108 can be made of one or more other materials that are denser than the material of the first structure 104.

Figure 1C:
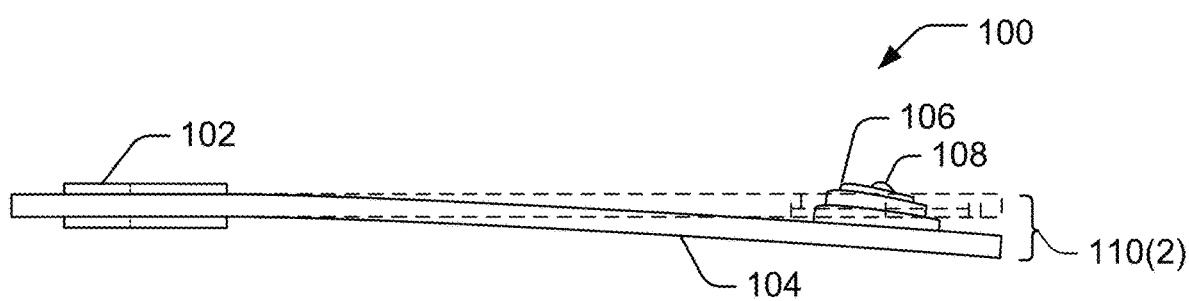
FIG. 1C illustrates another right-side perspective of the example haptic device of FIG. 1A in a second position.

FIG. 1C illustrates a right-side perspective of the example haptic device 100 with actuator 102, first structure 104, second structure 106, and local mass 108 at a second example state of motion with the second structure 106 and local mass 108 rebounding up before the first structure 104. FIG. 1C shows the mode shape of the haptic device 100 at an example resonance frequency (e.g., ~65 Hz), with harmonic excitation at the actuator 102.

The example shows out-of-phase mode coupling to dampen resonance locally at the mass 108, which occurs at about twice the example frequency. There is a greater displacement 110(2) than if there had been more grooves or cuts in the same patch area (second structure 106) and/or no local mass 108, thereby failing to achieve mode coupling.

Figure 2:
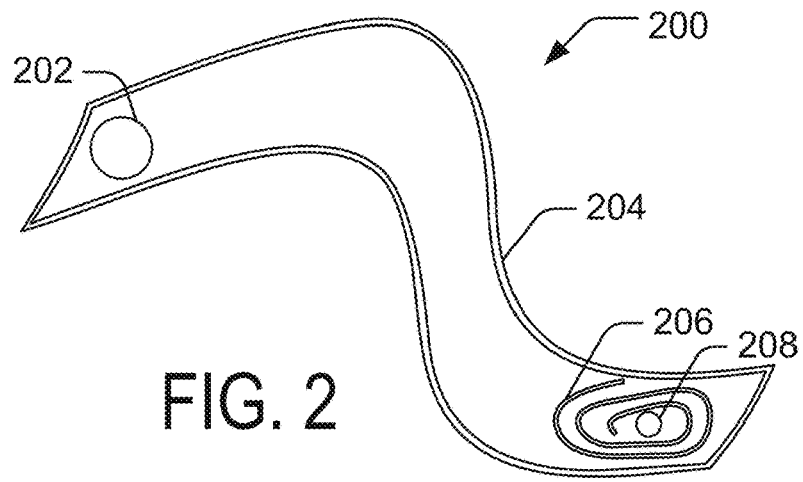
FIG. 2 illustrates a perspective view of another example haptic device as described herein with a curved cantilever.

FIG. 2 illustrates a perspective view of an example haptic device 200 with a first structure implemented as a curved cantilever. A curved cantilever can increase the length of the first structure in a small area, which can enable use of lower frequencies of coupled resonance. A curved cantilever can enable the haptic device to be extended to remote haptics where the cantilever can create a path from the actuator to a relatively remote site for local haptic feedback. In various examples, a distance between the actuator and the excitation cite in remote haptics can range from at least about 10 mm to at most about 300 mm. In FIG. 2, haptic device 200 includes an actuator 202, which in various examples can represent a motor or other vibration source and can correspond to actuator 102 from FIG. 1. The actuator 202 can be coupled to a first structure 204, which is illustrated as a curved cantilever. The first structure 204 can be in the form of a curved plate of a variety of dimensions, which can be the same or different than those described above with regard to FIG. 1A. In various examples, radius curvature of the first structure 204 can be as low as about 1 mm, and high enough to make it flat as seen in 104 in FIG. 1A. The first structure 204 can be made from a variety of materials, which can be the same or different than those described above with regard to FIG. 1A. The first structure 204 can be coupled to a second structure 206. The curved plate can include between one and about ten curves.

In the example illustrated in FIG. 2 the second structure 206 is shown as a roughly spiral structure, though other configurations are possible. For example, in addition to or instead of the illustrated roughly spiral structure, the second structure 206 could include a spring, a co-axial spring, an elastomer patch, and/or a web of fibers, e.g., elastomeric fibers. In at least one example, the second structure 206 can be formed as a part of the first structure 204. For example, the second structure 206 can be formed from a thicker part of the first structure 204 into which a spiral shape has been formed. Depth and thickness of grooves, cuts, and/or the material of the second structure can change displacement amplitude in response to the same resonance frequency from the actuator 202 such that a second structure 206 that is softer and/or with deeper grooves or cuts can allow for more dampening from touch and less displacement from application of a resonance frequency by the actuator 202 to the first structure 204.

In the illustrated example, the second structure 206 has an embedded or adhered local mass 208. The local mass 208 can be formed from the same material as the second structure 206 and/or a different material. When the local mass 208 is formed from the same material, a greater volume of material can be used to form the local mass 208. When the local mass 208 is formed from a different material, a lesser volume of a material having greater density than that of the first structure and/or second structure can be used to form the local mass 208, which can be the same or different than those described above with regard to FIG. 1A. Application by the actuator 202 of a resonance frequency to the first structure 204 can cause the first structure 204 and the second structure 206 to resonate in phase and displace the local mass 208.

Figure 3:
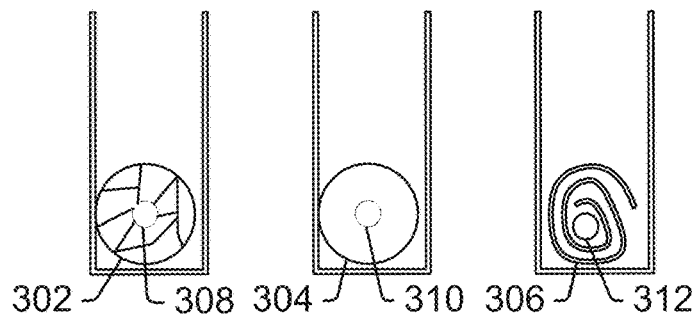
FIG. 3 illustrates three examples of second structures with a local mass as described herein.

FIG. 3 illustrates three examples of second structures 302, 304, 306 that can be associated with a haptic device such as haptic devices 100, 200 as described herein. Each of the illustrated second structures has a corresponding local mass 308, 310, 312, which can correspond to local mass 108, 208 as described herein.

The illustrated second structure 302 includes a web of fibers, e.g., elastomeric fibers with an embedded or adhered local mass 312, which is similar to local mass 108, 208. In some examples, second structure 302 can represent a spring, e.g., a co-axial spring. The illustrated second structure 304 includes an elastomer patch with an embedded or adhered local mass 310, which is similar to local mass 108, 208. The illustrated second structure 306 includes a roughly spiral structure, which is similar to the second structure 206 with an embedded or adhered local mass 308, which is similar to local mass 108, 208.

Figure 4:
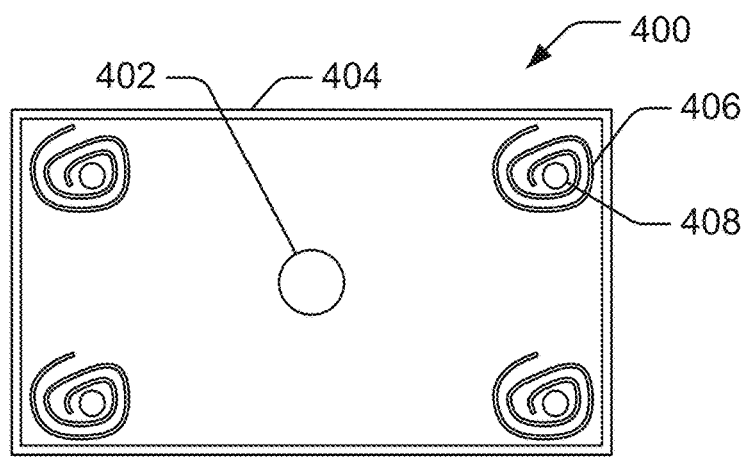
FIG. 4 illustrates another example haptic device as described herein with second structures with local masses at the corners of a rigid plate.

FIG. 4 illustrates a top view of an example haptic device 400 as described herein. In FIG. 4, haptic device 400 includes an actuator 402, which in various examples can represent a motor or other vibration source and can correspond to actuator 102 from FIG. 1 or 202 from FIG. 2. In the illustrated example, actuator 402 is coupled to a first structure 404, which is illustrated as a rigid plate. The first structure 404 have a variety of dimensions, which can be the same or different than those described above with regard to FIG. 1A. In various examples, an area of the plate 404 can be at least about 10 mm$^2$ to at most about 2500 mm$^2$. The first structure 404 can be made from a variety of materials, which can be the same or different than those described above with regard to FIG. 1A. The first structure 404 can be coupled to one or more second structures 406; in the illustrated example, four second structures 406 are presented in the four corners of first structure 404.

In the example illustrated in FIG. 4, the second structures 406 are each shown as a roughly spiral structure, though other configurations are possible. For example, in addition to or instead of the illustrated roughly spiral structure, one or more of the second structures 406 can include an elastomer patch like that shown at 304 in FIG. 3, and/or a web of fibers, elastomeric fibers, like that shown at 306, FIG. 3. In at least one example, one or more of the second structures 406 can be formed as a part of the first structure 404. For example, one or more of the second structures 406 can be formed from a thicker part of the first structure 404 into which a spiral shape has been formed. Depth and thickness of grooves, cuts, and/or the material of one or more of the second structures 406 can change displacement amplitude in response to the same resonance frequency from the actuator 402 such that one or more of the second structures 406 that is softer and/or with deeper grooves or cuts can allow for more dampening from touch and less displacement from application of a resonance frequency by the actuator 402 to the first structure 404.

In the illustrated example, each of the second structures 406 has an embedded or adhered local mass 408, which can be the same or different than those described above with regard to FIG. 1A. In some examples, topology of the plate first structure 404, one or more of the second structures 406, and one or more of the local masses 408, can be engineered such that different second structures 406 locally resonate in phase with the corners of a plate first structure 404 at different frequencies. This enables a haptic surface with high local force vibro-tactile feedback, where multiple regions can resonate independently at distinct low frequencies.

FIG. 5 generally presents examples of compound materials from which second structures, e.g., 106, 206, 302, 304, 306, 406, can be made. As shown in legend 500, a local mass 502 is illustrated as a circle, a primary structure 504, e.g., primary spring material, is illustrated with a hatched pattern, a secondary structure 506, e.g., secondary spring material, is illustrated with a dotted pattern. In some examples, the first structure and second structure can be made of springs, which can be co-axially arranged in a variety of ways to reduce the form factor of a haptic device. Each of these structures can be engineered to resonate in phase with each other at low frequencies and can be formed as conventional coiled springs and/or represent a material with an architected topology/structure.

Figure 5A:
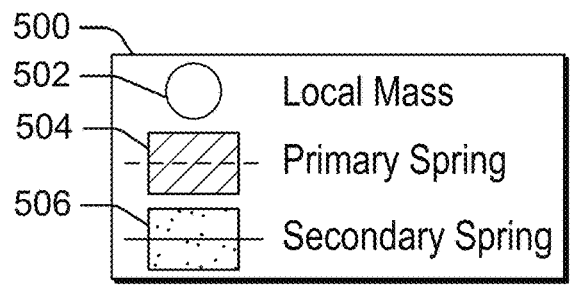
FIG. 5A illustrates an example configuration of material of a compound second structure as described herein.
Figure 5A:
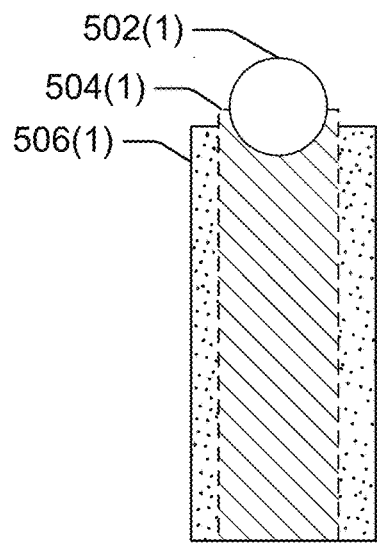

FIG. 5A illustrates an example configuration of material of a compound second structure with a local mass as described herein. In FIG. 5A, a local mass 502(1) is attached to a primary structure 504(1), e.g., primary spring material, which is coupled to a secondary structure 506(1), e.g., secondary spring material. FIG. 5A, in some examples, can represent a cross section of a portion of a second structure or FIG. 5A, in various examples, can represent a top view of a portion of a second structure.

Figure 5B:
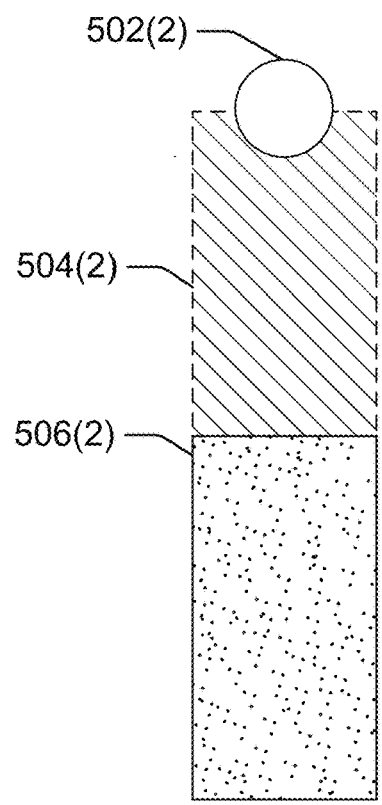
FIG. 5B illustrates another example configuration of material of a compound second structure as described herein.

FIG. 5B illustrates an example configuration of material of a compound second structure with a local mass as described herein. In FIG. 5B, a local mass 502(2) is attached to a primary structure 504(2), e.g., primary spring material, which is coupled to a secondary structure 506(2), e.g., secondary spring material. FIG. 5B, in various examples, can represent a top view of a portion of a second structure.

Figure 5C:
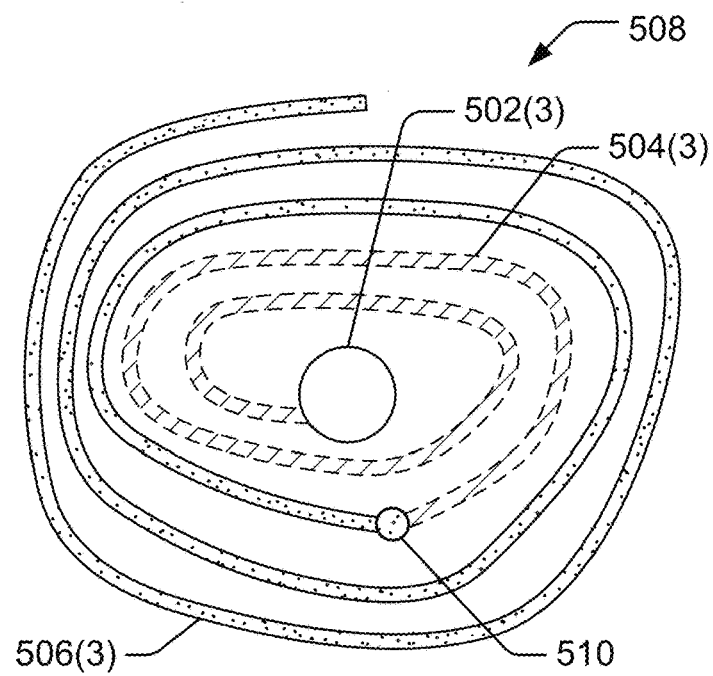
FIG. 5C illustrates an example compound second structure with a local mass as described herein with two springs coupled in series.

FIG. 5C illustrates an example compound second structure 508 with a local mass 502(3) as described herein with two springs coupled in series. In FIG. 5C, a local mass 502(3) is attached to a primary structure 504(3), e.g., primary spring material, which is coupled to a secondary structure 506(3), e.g., secondary spring material, at 510. The illustrated location of coupling 510 can represent a weld, adherence, or other attachment, which in some examples can form a second local mass in second structure 508. FIG. 5C, in various examples, can represent a top view of second structure 508, which can correspond to second structures 106, 206, 406. Various types and combinations of first structures and second structures can be used in a variety of haptic devices. Examples include a wristband, a headset, a glove, etc. to produce strong localized vibrations close to or far away from an actuator.

Figure 6:
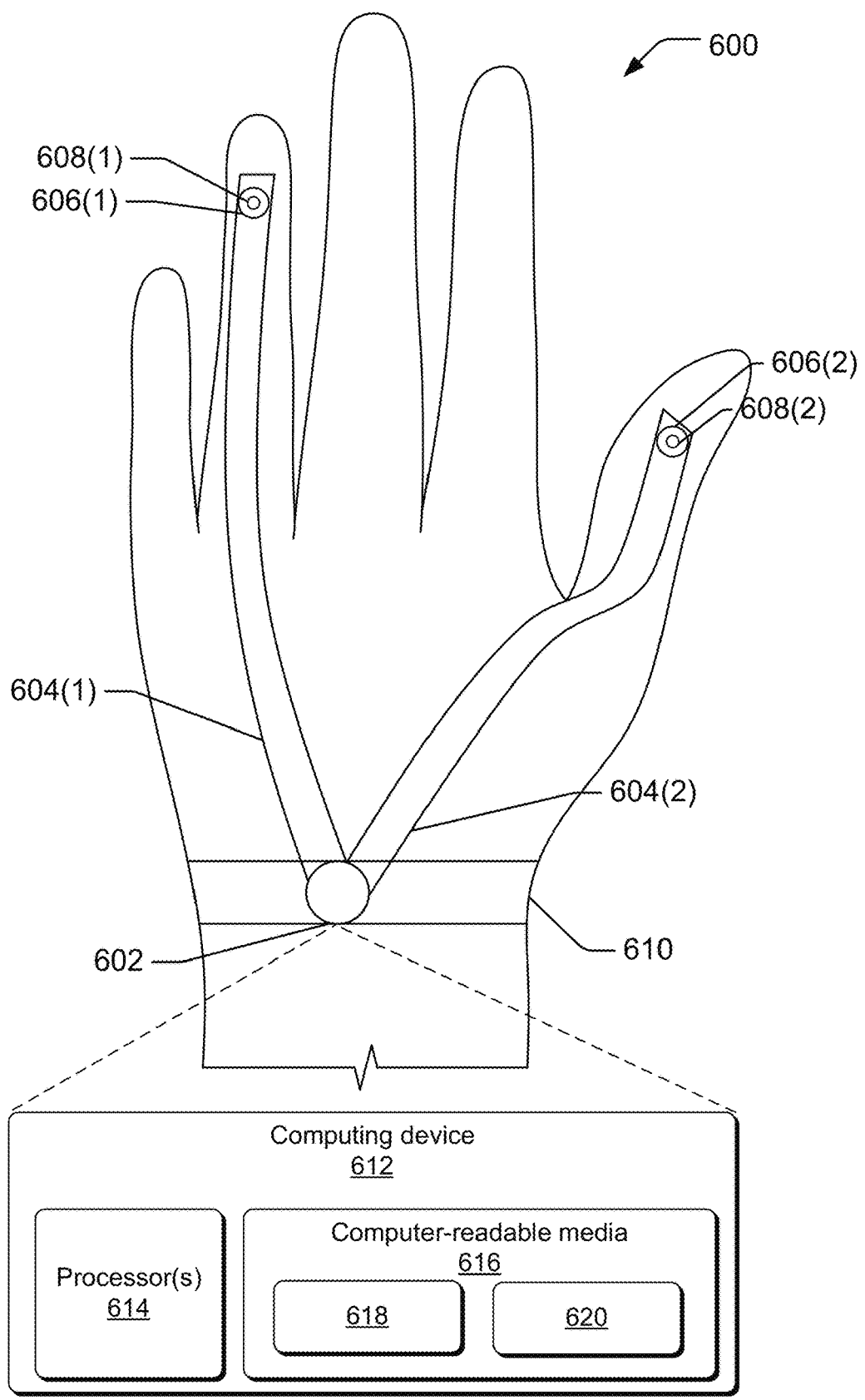
FIG. 6 illustrates an example haptic device as described herein implemented as a wearable device.

FIG. 6 illustrates an example haptic device as described herein implemented as a wearable device 600, which in some examples can represent a harness, a glove, or a part of a glove. In FIG. 6, the wearable haptic device 600 includes an actuator 602, which in various examples can represent a motor or other vibration source and can correspond to actuator 102, 202, 402. In the illustrated example, actuator 602 is coupled to a plurality of first structures 604(1) and 604(2), which are illustrated as a cantilever 604(1) and a curved cantilever 604(2), though more or fewer first structures, including first structures of different forms can be included. Each of the first structures 604 can have a variety of dimensions and each can be made from a variety of materials. In various examples, length of a first structure 604 can be at least about 10 mm to at most about 150 mm. Each of the first structures 604 can be coupled to one or more second structures 606; in the illustrated example, a second structures 606(1) is coupled to a first structure 604(1) and a second structures 606(2) is coupled to a first structure 604(2).

In the example illustrated in FIG. 6 the second structures 606 are each shown as an elastomer patch, though other configurations are possible. For example, in addition to or instead of the illustrated elastomer patches, one or more of the second structures 406 can include a spring, a roughly spiral structure like that shown at 302, FIG. 3, and/or a web of fibers, e.g., elastomeric fibers, like that shown at 306, FIG. 3. In at least one example, one or more of the second structures 606 can be formed as a part of the first structure 604. For example, one or more of the second structures 606 can be formed from a thicker part of the first structure 604 into which a spiral shape has been formed. Depth and thickness of grooves, cuts, and/or the material of one or more of the second structures 606 can change displacement amplitude in response to the same resonance frequency from the actuator 602 such that one or more of the second structures 606 that is softer and/or with deeper grooves or cuts can allow for more dampening from touch and less displacement from application of a resonance frequency by the actuator 602 to the first structures 604.

In the illustrated example, each of the second structures 606 has an embedded or adhered local mass 608. The local mass 608 can be formed from the same material as the second structure 606 and/or a different material; this/these materials can be the same or different than those described above with regard to FIG. 1A. In the illustrated example, local resonance at the local masses 608 can create haptic feedback at the fingertips remote from an actuator 602, which is located at the wrist.

In the illustrated example, actuator 602 is coupled to a band 610, e.g., a wrist band, to make the actuator and other parts of the wearable device 600 wearable. In various examples, the band 610 can represent a stand-alone configuration akin to a bracelet or watch. In such examples, one or more additional bands can be present to anchor to one or more fingers. In some examples, the band 610 can represent a configuration that can be included as a wrist-band part of a glove-type wearable device 600, and the first and/or second structures can be coupled to fabric of the glove-type wearable device 600.

In the illustrated example, actuator 602 is coupled to a computing device 612. In various examples, computing device 612 can control a haptic device such as haptic device 600 (and/or any of the other haptic devices described herein). In examples, a computing device 612 can include one or more processor(s) 614 coupled to one or more computer-readable media 616 with instructions to actuate the haptic device 600. For example, computing device 612 can be programmed to drive the haptic device at resonance and/or out of phase to dampen resonance.

In various examples, the processors(s) 614 can include one or more of a central processing unit (CPU), a graphics processing unit (GPU), a microprocessor, a digital signal processor, and/or other processing units or components. Alternatively, or in addition, the processing described herein can be performed, at least in part, by one or more hardware logic components. For example, and without limitation, illustrative types of hardware logic components that can be used include field-programmable gate arrays (FPGAs), application-specific integrated circuits (ASICs), application-specific standard products (ASSPs), system-on-a-chip systems (SOCs), complex programmable logic devices (CPLDs), etc. Additionally, each processor(s) 614 can possess its own local memory, which also can store programs, program data, and/or one or more operating systems. Furthermore, the one or more processor(s) 614 can include one or more cores.

The computer-readable media 616 can include volatile and/or nonvolatile memory, removable and non-removable media implemented in any method or technology for storage of information, such as computer-readable instructions, data structures, program functions, or other data. Such memory includes, but is not limited to, RAM, ROM, EEPROM, flash memory or other memory technology, CD-ROM, digital versatile discs (DVD) or other optical storage, magnetic cassettes, magnetic tape, magnetic disk storage or other magnetic storage devices, RAID storage systems, or any other medium which can be used to store the desired information, and which can be accessed by a computing device. The computer-readable media 616 can be implemented as computer-readable storage media (CRSM), which can be any available physical media accessible by the processor(s) 614 to execute instructions stored on the computer-readable media 616. In one implementation, CRSM can include random access memory (RAM) and/or Flash memory. In some implementations, CRSM can include, but is not limited to, read-only memory (ROM), electrically erasable programmable read-only memory (EEPROM), or any other tangible medium which can be used to store the desired information, and which can be accessed by the processor(s) 614. The computer-readable media 612 can have an operating system (OS) and/or a variety of suitable applications stored thereon. The OS, when executed by the processor(s) 614 can enable management of hardware and/or software resources of the computing device(s) 612 associated with haptic device 600 (and/or any of the other haptic devices described herein).

Several functional blocks having instruction, data stores, and so forth can be stored within the computer-readable media 616 and configured to execute on the processor(s) 614. The computer-readable media 616 can have stored thereon a datastore(s) 618, program code(s) 620, etc. It will be appreciated that each of the blocks 618, 620, etc. can include instructions that when executed by the processor(s) 614 enable various functions pertaining to the operations of the computing device(s) 612 associated with haptic device 600 (and/or any of the other haptic devices described herein). It should further be noted that one or more of the functions associated with blocks 618, 620, etc. can operate separately or in conjunction with each other.

Figure 7:
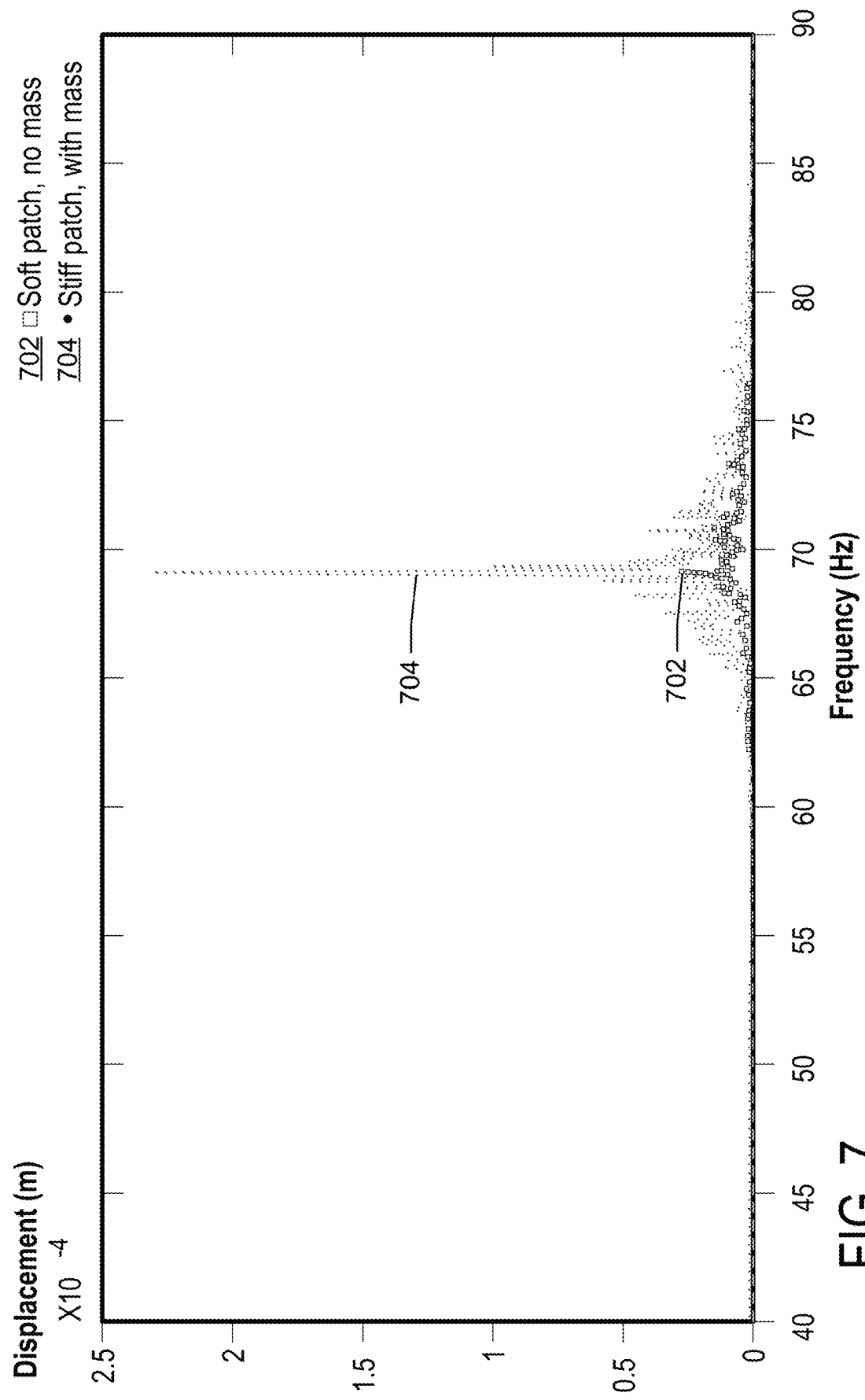
FIG. 7 is a diagram illustrating a comparison to an example of displacement over frequency of a haptic device as described herein.

FIG. 7 is a diagram illustrating examples of displacement in meters on the y-axis over frequency in hertz on the x-axis of a haptic device as described herein. A first haptic device with a soft patch, e.g., thick grooves or cuts, and no added mass as designated by squares, 702, a demonstrates displacement amplification without mode-coupling, at low frequency compared to a second haptic device as described herein with a stiffer patch and added point mass as designated by dots, 704, demonstrating displacement and stiffness amplification, at the same frequency as the first haptic device. Consistent with FIG. 7, in tests the stiffer structure showed much larger displacement amplification compared to the soft structure also on contact with skin.

The displacement amplification remains high (~30 times) for the described device on contact with skin, while the device depicted in FIG. 4*a* to amplify displacements falls significantly short (FIG. 4(*c*)). This can be attributed to the high stiffness of our device. Also notice that the resonance frequency does not shift on contact with skin in this example.

In summary, the described device is able to achieve large local displacements by coupling the modes of resonance of a primary structure (the cantilever) with a secondary compliant surface (the circular patch), at low frequencies, while maintaining high local stiffness (indicated in FIG. 4(*b*)). This results in larger vibro-tactile forces at frequencies that are well within the perceivable range in haptics. Such a device would be a significant improvement over conventional techniques, where large displacements at low frequencies are achieved at the cost of local stiffness. The example values mentioned herein are further verified with finite element simulations.

Figure 8:
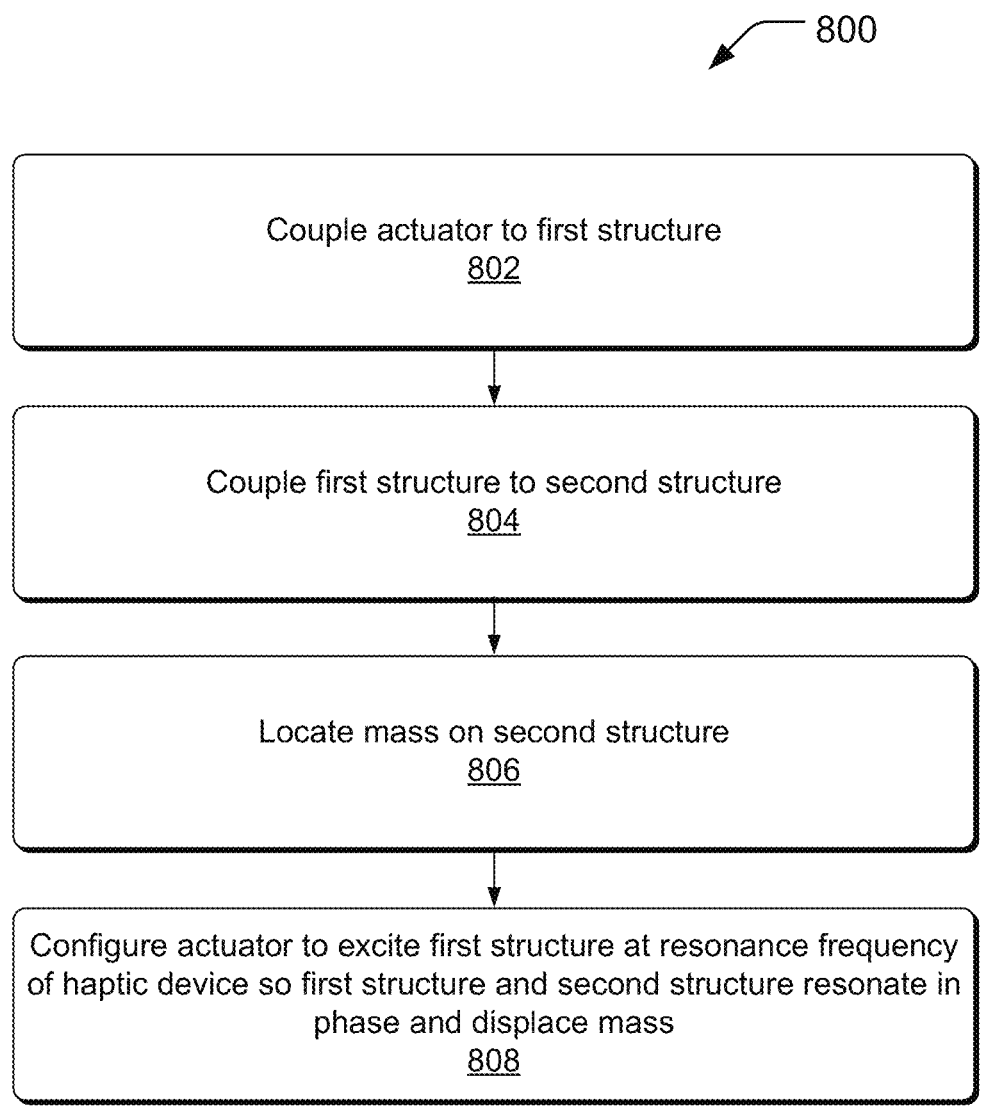
FIG. 8 is a flow diagram of an example process of forming a haptic device as described herein.

FIG. 8 is a flow diagram of an illustrative process for forming a haptic device as described herein. In the process 800, each block represents one or more operations that can be implemented when manufacturing a haptic device. The order in which the blocks are described is not intended to be construed as a limitation, and any number of the described operations can be combined in any order and/or in parallel to implement the processes. For discussion purposes, the process 800 is described with reference to the haptic device 100, and it can equally be applied to haptic devices 100, 200, 400, and/or 600 and/or example compound second structure 508 as described above.

At block 802, an actuator, e.g., 102, is coupled to a first structure, e.g., 104. As discussed above, examples of an actuator include, without limitation, a motor or other vibration source. The first structure can include a cantilever, plate, and/or spring as discussed above, which can have a variety of dimensions such as any of those discussed herein, or other dimensions.

At block 804, the first structure, e.g., 104 can be coupled to a second structure, e.g., 106. In various examples, the second structure can represent a part of the first structure, such as a thicker part of the first structure into which a spiral shape has been formed and/or the second structure can represent a separate structure of the same or a different material adhered or otherwise affixed to the first structure. Depth and thickness of grooves, cuts, and/or the material of the second structure can change displacement amplitude in response to the same resonance frequency from the actuator such that a second structure that is softer and/or with deeper grooves or cuts can allow for more dampening from touch and less displacement from application of a resonance frequency by the actuator to the first structure. As discussed above, examples of a second structure include, without limitation, a spiral, a spring, a co-axial spring, an elastomer patch and/or a web of fibers, e.g., elastomeric fibers. In some examples the process of forming a haptic device can include forming the second structure as at least one of: a spiral structure, a spring, a patch, or a web of fibers, elastomeric fibers. For example, a spiral can be formed by a process including injection molding, laser cutting, three-dimensional printing, and/or cutting, an elastomer patch can be formed by molding, cutting from an elastomeric sheet, etc., and/or a web can be comprised of fibers, e.g., elastomeric fibers.

At block 806, a mass, e.g., 108, can be located on one or both of the first structure, e.g., 104, and/or the second structure, e.g., 106. In various examples, the mass can be embedded, adhered to and/or affixed to the second structure At block 808, the actuator, e.g., 102, can be configured to, upon activation, excite the first structure at a resonance frequency of the haptic device such that the first structure and second structure resonate in phase and displace the mass. In some examples with a third structure coupled to the first structure in a location separate from the actuator and having an associated second mass, the actuator can be configured to apply a second resonance frequency to the first structure to cause the first structure and the third structure to resonate in phase and displace the second mass, and to cause the first structure and the second structure to resonate out of phase. This can lead to dampening vibrations in those regions of the haptic device.

Figure 9:
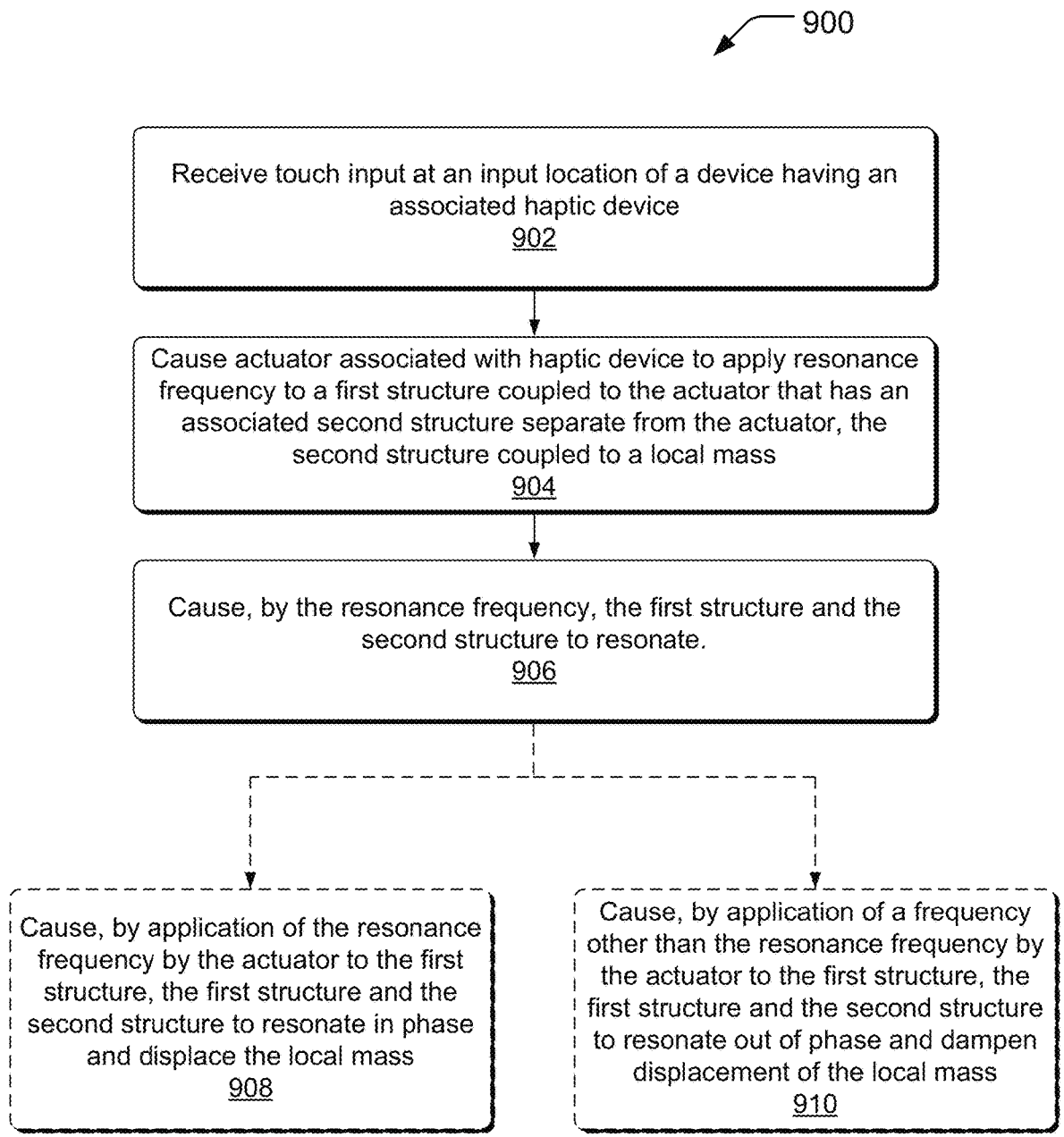
FIG. 9 is a flow diagram of an example process of using a haptic device as described herein.

FIG. 9 is a flow diagram of an illustrative process for using a haptic device as described herein. In the process 900, each block represents one or more operations that can be implemented when using a haptic device. The order in which the blocks are described is not intended to be construed as a limitation, and any number of the described operations can be combined in any order and/or in parallel to implement the processes. For discussion purposes, the process 900 is described with reference to the haptic device 100, and it can equally be applied to haptic devices 100, 200, 400, and/or 600 and/or example compound second structure 508 as described above.

At block 902, a device receives input, e.g., touch input via a surface such as a touchscreen or housing associated with a haptic device, e.g., haptic device 100.

At block 904, receiving the input can cause an actuator, e.g., 102, associated with haptic device 100, to apply a resonance frequency to a first structure, e.g., 104, that has an associated second structure, e.g., 106, that is separate from the actuator, and the second structure can be coupled to a local mass, e.g., 108.

At block 906, applying the resonance frequency can cause the first structure and the second structure to resonate in various ways. For example, at block 908, application of the resonance frequency by the actuator to the first structure can cause the first structure and the second structure to resonate in phase and displace the local mass a mass. At other times, for example, at block 910, application of a frequency other than the resonance frequency by the actuator to the first structure can cause the first structure and the second structure to resonate out of phase and dampen displacement of the local mass.

CONCLUSION

Although examples have been described in language specific to structural features and/or methodological acts, it is to be understood that the disclosure is not necessarily limited to the specific features or acts described. Rather, the specific features and acts are described as illustrative forms of implementing the examples. In various examples, any of the structural features and/or methodological acts described herein can be rearranged, modified, or omitted entirely.

Although the subject matter has been described in language specific to structural features and/or methodological acts, it is to be understood that the subject matter defined in the appended claims is not necessarily limited to the specific features or acts described. Rather, the specific features and acts are disclosed as illustrative forms of implementing the claims.

What is claimed is:

1. A device comprising:
   an actuator;
   a first structure coupled to the actuator;
   a second structure coupled to the first structure and separate from the actuator; and
   a local mass coupled to the second structure,
   wherein the first structure and the second structure have resonance, such that application by the actuator of a resonance frequency to the first structure causes the first structure and the second structure to resonate in phase and displace the local mass.

2. The device of claim 1, wherein the first structure comprises a cantilever between the actuator and the second structure.

3. The device of claim 1, wherein the second structure comprises:
   a spiral structure,
   an elastomer patch, or
   a web of fibers.

4. The device of claim 1, wherein the first structure includes a first spring, and the second structure includes a second spring coupled in series with the first spring.

5. The device of claim 1, wherein the local mass is a first local mass, the device further comprising:
   a third structure coupled to the first structure and separate from the actuator; and
   a second local mass coupled to the third structure.

6. The device of claim 5, wherein:
   the resonance frequency is a first resonance frequency, and
   the application by the actuator of a second resonance frequency to the first structure causes:
      the first structure and the third structure to resonate in phase and displace the second local mass, and
      the first structure and the second structure to resonate out of phase.

7. The device of claim 1, wherein the first structure has a first density, and the second structure has a second density that is less than the first density.

8. The device of claim 7, wherein the local mass has a third density that is greater than the first density.

9. The device of claim 8, wherein the local mass is a first local mass, the device further comprising:
   a third structure coupled to the first structure and separate from the actuator, the third structure having a fourth density that is less than the first density; and
   a second local mass coupled to the third structure, the second local mass having a fifth density that is greater than the first density.

10. The device of claim 9, wherein:
    the resonance frequency is a first resonance frequency,
    the second structure has a second density that is less than the first density, and the fourth density is different than the second density,
    the fifth density is different than the third density, and
    the application by the actuator of a second resonance frequency to the first structure causes:

the first structure and the third structure to resonate in phase and displace the second local mass, and
the first structure and the second structure to resonate out of phase.

11. The device of claim 1, wherein the device is a wearable device, and the actuator is located remote from the second structure.

12. The device of claim 11, wherein:
the wearable device is a glove,
the second structure and the local mass are located at a fingertip of the glove, and
the actuator is located at a wrist or a back of the glove.

13. The device of claim 1, wherein the local mass is comprised of tungsten carbide.

14. A method of forming a haptic device comprising:
coupling an actuator to a first structure;
coupling the first structure to a second structure;
locating a mass on at least one of the first structure or the second structure; and
configuring the actuator to, upon activation, excite the first structure at a resonance frequency of the haptic device such that the first structure and second structure resonate in phase and displace the mass.

15. The method of forming the haptic device as claim 14 recites, further comprising forming the second structure as at least one of: a spiral structure, a patch, or a web.

16. The method of forming the haptic device as claim 15 recites, wherein at least one of:
the spiral structure is formed by a process including: injection molding, three-dimensional printing, or cutting,
the patch includes an elastomer patch, or
the web is comprised of fibers.

17. The method of forming the haptic device as claim 15 recites, further comprising affixing the mass to the second structure.

18. A method of using a device comprising:
receiving a touch input at an input location of the device having an associated haptic device;
causing, based on receiving the touch input, an actuator associated with the haptic device to apply a resonance frequency to a first structure of the device that is coupled to the actuator and has an associated second structure that is separate from the actuator, the second structure coupled to a local mass, wherein the resonance frequency causes the first structure and the second structure to resonate.

19. The method of claim 18, wherein application by the actuator of the resonance frequency to the first structure causes the first structure and the second structure to resonate in phase and displace the local mass.

20. The method of claim 18, wherein application by the actuator of a frequency other than the resonance frequency to the first structure causes the first structure and the second structure to resonate out of phase and dampen displacement of the local mass.

* * * * *